United States Patent Office 2,786,037
Patented Mar. 19, 1957

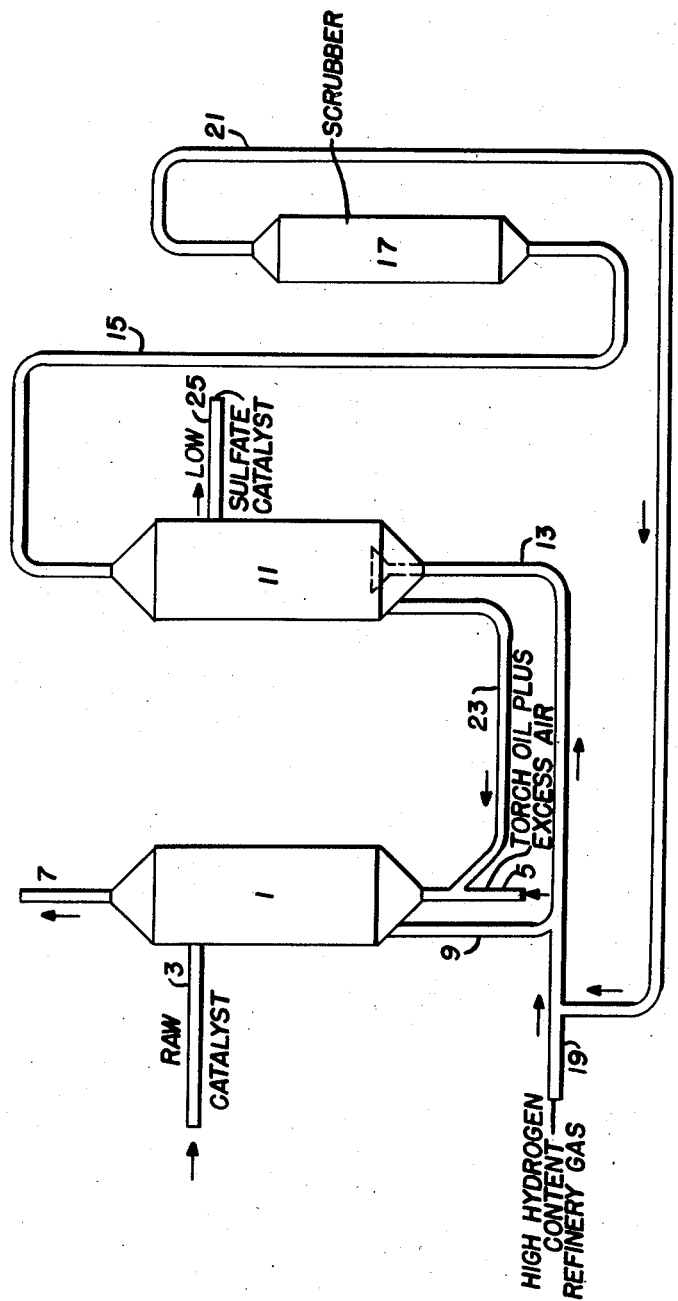

2,786,037

PROCESS FOR MANUFACTURE OF METAL OXIDE CATALYSTS OF LOW SULFATE CONTENT

Elroy M. Gladrow, Baton Rouge, and Trent Lane, Baker, La., assignors to Esso Research and Engineering Company, a corporation of Delaware Application April 1, 1953, Serial No. 346,205

2 Claims. (Cl. 252—448)

The present invention pertains to the manufacture of catalysts and particularly to the manufacture of catalysts for hydrocarbon conversions such as cracking of higher boiling oils to produce motor fuels or other lower boiling products or for the reforming or hydroforming of lower boiling hydrocarbons or naphtha fractions into motor fuels of excellent anti-knock and engine cleanliness characteristics.

In a number of commercial processes for making catalysts or catalyst bases for use in hydrocarbon conversions in the petroleum industry considerable amounts of sulfuric acid and/or solutions of metal sulfates are employed. To cite a few examples, large amounts of sulfuric acid are employed to convert sodium silicate into silica sol or gel for use in the manufacture of silica-alumina, silica-magnesia and silica-alumina-magnesia cogel catalysts that are widely used as catalysts for cracking hydrocarbon oils. In addition, in the manufacture of silica-alumina catalysts, aluminum sulfate is used as the means for introducing alumina into the silica gel. Hydroforming catalyst bases consisting essentially of alumina as well as of zinc aluminate spinel are frequently made by processes employing aluminum sulfate. For example, one such process for making alumina employs aluminum sulfate and sodium aluminate solutions while one process for preparing a zinc aluminate spinel base involves the reaction of zinc sulfate with sodium aluminate.

While each of the above cited examples ultimately yields a suitable catalyst or catalyst base, the residual sulfate must be removed or reduced to a very small amount before the catalyst or catalyst support may be used. Generally this is done by washing with water. In view of the gelatinous character of the reaction products, water washing is both time-consuming and expensive. This is particularly true in the case of silica-alumina catalysts of high alumina content and alumina and zinc aluminate spinel catalyst supports. The first stages of washing remove a large proportion of the sulfate but the remainder becomes increasingly difficult to remove by washing. It is necessary, however, to remove considerable amounts of difficultly removable sulfate ions in order to bring the sulfate content to within specification limits since the presence of sulfate in the catalyst serves to decrease activity and to impair its selectivity or its ability to form useful products.

It is the object of this invention to prepare hydrocarbon conversion catalysts and catalyst supports of low sulfate content.

It is also an object of this invention to prepare hydrocarbon conversion catalysts and catalyst supports of low sulfate content by processes involving the use of sulfuric acid and/or metal sulfates while avoiding prolonged and expensive washing procedures.

These and other objects will appear more clearly from the detailed specification and claims set out below.

It has now been found that hydrocarbon conversion catalysts and catalyst supports of low sulfate content may be prepared by processes involving the use of sulfuric acid and/or metal sulfates while avoiding prolonged and expensive washing procedures if the hydrous metal oxides comprising the raw catalyst or catalyst support are given a short or preliminary washing to remove the bulk of the sulfates whereupon the said metal oxides are either oven dried or spray dried and then subjected to alternate hydrogen and air treats at elevated temperatures to lower the sulfate level to within specification limits. The alternate hydrogen and air treats are used to reduce the sulfur content at a more rapid rate. Treatment with hydrogen alone results in a rapid initial loss of sulfur as hydrogen sulfide but the rate of $H_2S$ evolution is not sustained. Stripping the catalyst or catalyst base with air or other suitable gases restores the solid material to a state which makes it susceptible to further rapid reduction in sulfur content with hydrogen.

A diagrammatic flow plan of a method for effecting sulfate reduction in accordance with the present invention is illustrated in the accompanying drawing.

Raw catalyst, which may have received a short preliminary wash to remove the bulk of sulfates and was then either oven dried or spray dried, is introduced into vessel 1 through line 3. Torch oil or other suitable fuel is burned in excess air and the products introduced into the bottom of vessel 1 through line 5 at a rate sufficient to maintain a fluid bed of solids. Effluent gases are removed overhead via line 7 which may include a cyclone separator, not shown. As is evident, the purpose of the torch oil is to produce the necessary heat to carry out the reduction process. When sufficient catalyst has been added to reactor vessel 1 and suitable temperatures are attained, hot overflow catalyst is routed via the downcomer 9 where it is contacted with hydrogen or a refinery gas stream rich in hydrogen, introduced through line 19, and carried to reactor vessel 11 via line 13. The $H_2S$ evolved in reactor zone 11 is taken overhead through line 15 with the excess hydrogen gas and passed through a cyclone (not shown) to a scrubber 17 which may be a caustic solution or Girbitol, etc. to remove the $H_2S$. The unabsorbed gases are taken overhead and recycled through line 21 to line 19 where they are mixed with make-up hydrogen. The treated catalyst in reactor vessel 11 is kept in a fluidized state and recycled through downcomer 23 back to reactor 1 where it is stripped of adsorbed $H_2S$ and the process repeated. When the sulfate content of the catalyst reaches the prescribed level in reactor 11 the low sulfate catalyst is drawn off via line 25 for use. The make-up rate of raw catalyst through line 3 is adjusted to the withdrawal rate of finished catalyst. An auxiliary heater may be installed with vessel 11 to maintain the temperature at the desired level. Temperatures in the range of 600–1100° F. or higher may be employed, preferably at 900–1025° F. Transfer of catalyst from vessel to vessel may be by means of standpipes and dilute phase risers or by means of dense phase U-bend transfer lines. Valves, compressors and the like have not been shown but are, of course, provided as needed in the system to control or facilitate the transfer of solids in the system.

Some of the advantages of this process are:

1. The sulfate level can be adjusted to any prescribed level depending on the temperature and catalyst withdrawal and addition rates.

2. Eliminates the long, time-consuming, water-washing operation which becomes expensive when the large volumes of pure water required are taken into consideration.

3. Use of fluidized solids technique makes for easy handling of the materials.

The present invention is applicable to a wide variety of catalysts and/or catalyst supports that involve the use of sulfuric acid or metal sulfates in their preparation.

It may, for example, be utilized to free silica gel prepared from sodium or other alkali metal silicate by reaction with sulfuric acid in well-known manner. It may also be used to free a cogel of silica with alumina and/or magnesia in which the silica gel preparation involved the use of sulfuric acid or the alumina or magnesia was incorporated by compositing the silica with sulfate of aluminum or magnesium and precipitating the latter in the form of a hydrous metal oxide by adding a suitable alkali. It may further be used to rid alumina or magnesia prepared as a hydrous oxide by treating solutions of aluminum sulfate or magnesium sulfate with an alkali such as ammonium hydroxide or by reacting aluminum sulfate and sodium aluminate. It may also be used with particular advantage to remove residual sulfate from zinc aluminate spinel prepared by reacting zinc sulfate with sodium aluminate as disclosed in Kearby U. S. Patent No. 2,447,017, dated August 17, 1948.

The hydrous metal oxides containing residual impurities are given a preliminary washing with water to remove the bulk of the easily removable sulfate and dried, preferably by spray drying in order to form spherical or spheroidal particles which are particularly suitable for use in fluidized solids reactor systems.

The dried metal oxides are then subjected to the alternate oxidation and reduction operation, in accordance with the present invention. The oxidation and reduction is carried out at temperatures of about 900–1200° F., preferably at about 1000–1050° F. The number of cycles of oxidation and reduction to which the metal oxides are subjected will vary upon the amount of sulfate ion contained in the starting material and the desired or specification limit for the finished product.

For purposes of illustration, the following specific examples are presented to show the efficacy of the operation for reducing the sulfur content of catalyst and catalyst base materials.

*Example I*

A zinc-aluminate spinel used as a hydroforming catalyst base was made as follows. About 33.5 gallons of a commercial sodium aluminate solution comprising 20.0% $Al_2O_3$, 12.1% $Na_2O$, and 8.0% excess NaOH was diluted with about 72 gallons of water. In a separate vessel, about 234 pounds of $ZnSO_4·7H_2O$ was dissolved in about 70.8 gallons of water to which about 2.5 gallons of 98% $H_2SO_4$ was added. The dilute sodium aluminate solution and the zinc sulfate solution were fed simultaneously into a large mixing vessel using agitation. The resulting slurry of zinc-aluminate had a total volume of about 190–200 gallons. The pH of the slurry was adjusted to a pH value of about 8 by the addition of 10% $H_2SO_4$ solution. After the pH was adjusted, the slurry was aged for about one hour and filtered. The filter cake was then reslurried with about 160 gallons of water and filtered. The reslurrying and filtering operation was repeated three more times, each cycle requiring an additional 160 gallons of water and about one hour or more time. The sulfate content of the solids (dry basis) after the five water washings was 14.8%. This filter cake was used as the starting material in the preparation of the following two catalysts.

*Example II*

About 76 pounds of the water washed filter cake prepared as described above was slurried with about 50 gallons of 0.25% ammonium hydroxide solution, filtered, and rewashed with the same quantity of water. The filter cake was then given another weak ammonia wash using 50 gallons of 0.25% $NH_4OH$, filtered, and rewashed with an equal volume of water. Each washing operation required about 3 hours time, making a total of about 12 hours to carry out the 4 washings. The filter cake from this operation was dried in an oven at about 260° F. and then calcined overnight at about 1000° F. This zinc aluminate was analyzed for sulfate content and showed about 7.4% $SO_4$. A hydroforming catalyst was made from this zinc aluminate by impregnation with a solution of ammonium molybdate using about 1.35 pounds of ammonium molybdate dissolved in 3 quarts of water for each 10 pounds of zinc aluminate. After impregnation, the catalyst was re-dried at about 250° F. and re-activated 6 hours at 1200° F. This catalyst was pilled in the form of 3/16 inch by 3/16 inch cylindrical pellets and had a surface area of about 100 square meters per gram and a pore volume of about 0.42 cubic centimeter per gram of catalyst as determined by nitrogen adsorption. This catalyst comprises about 10% molybdena and is designated catalyst "A."

*Example III*

About 76 pounds of the water washed filter cake prepared as described above and having a sulfate content of 14.8% was dried in an oven at about 260° F. and then calcined overnight at about 1000° F. This material was pilled in the form of 3/16 inch by 3/16 inch cylindrical pellets and charged to a vessel heated to about 1000° F. Hydrogen was passed through the bed at a rate of about 650 cubic feet per hour for about 10 minutes after which time the hydrogen flow was cut off and air was passed through the system for about 10 minutes or more. The intermittent hydrogen-air cycle was repeated 17 times. The total time involved in the operation was about 6 hours. The sulfate content of the zinc aluminate was reduced to about 3.9%. This zinc aluminate was ground to a powder and converted into a hydroforming catalyst by impregnation with a solution of ammonium molybdate using about 1.35 pounds of ammonium molybdate dissolved in 3 quarts of water for each 10 pounds of zinc aluminate. After impregnation, the catalyst was re-dried at about 260° F. and re-activated 6 hours at 1200° F. This material was pilled into 3/16 inch by 3/16 inch cylindrical pellets for use as a hydroforming catalyst. Determination of the surface properties of the catalyst show a surface area of about 104 square meters per gram and a pore volume of about 0.26 cubic centimeter per gram. This catalyst comprises about 10% $MoO_3$ and is designated catalyst "B."

*Example IV*

Catalysts "A" and "B" prepared as described in Examples II and III respectively were employed in the form of 3/16 inch by 3/16 inch cylindrical pellets in a fixed catalyst bed operation for the hydroforming of a 200° F. to 330° F. boiling range virgin naphtha from mixed Southeast and West Texas crudes. The conditions employed are 900° F. temperature, 200 p. s. i. g. pressure, using 1500 cubic feet of feed hydrogen per barrel of naphtha feed, and a naphtha feed rate of approximately 0.7 weight of naphtha per weight of catalyst per hour. In the data which follow, adjustments were made in the feed rate to obtain a $C_6+$ product having an aniline point of 50° F.

| Catalyst | "A" | "B" |
| --- | --- | --- |
| Aniline Point of $C_6+$ Product, °F | 50 | 50 |
| Feed Rate, w./hr./w | 0.65 | 0.76 |
| Yield of $C_6+$ Products, Vol. Percent | 86 | 87 |

The foregoing description contains a limited number of embodiments of the present invention. It will be understood, however, that numerous variations are possible without departing from the scope of this invention.

What is claimed is:

1. In a process for preparing metal oxide catalysts and catalyst supports of low sulfate ion content wherein hydrous metal oxide composition as prepared contains a substantial amount of sulfate ions, the improvement which comprises water washing the hydrous metal oxide composition to remove a major portion of the sulfate ions, then drying the washed metal oxide composition, then reducing the sulfate ions to the desired low level by alternately treating the dried metal oxide composition for about 10 minutes with a hydrogen-rich gas and then stripping the treated metal oxide composition with an oxygen-containing gas for about 10 minutes while maintaining the metal oxide composition as a dense fluidized liquid-simulating mass and at a temperature between about 900° and 1200° F. and continuing the alternate treatments with hydrogen-rich gas and oxygen-containing gas for about 6 hours.

2. The process as defined in claim 1 wherein the composition treated comprises zinc aluminate spinel prepared by reaction of zinc sulfate with sodium aluminate.

References Cited in the file of this patent

UNITED STATES PATENTS

| | | |
|---|---|---|
| 1,832,217 | Joseph | Nov. 17, 1931 |
| 2,273,864 | Houdry | Feb. 24, 1942 |
| 2,403,052 | Cole et al. | July 2, 1946 |
| 2,409,690 | Nicholson et al. | Oct. 22, 1946 |
| 2,447,017 | Kearby | Aug. 17, 1948 |
| 2,455,419 | Johnson | Dec. 7, 1948 |
| 2,587,149 | Gwynn | Feb. 26, 1952 |